US012516471B1

(12) United States Patent
Anderson et al.

(10) Patent No.: US 12,516,471 B1
(45) Date of Patent: Jan. 6, 2026

(54) METHODS OF IMPARTING COLOR TO NYLON SUBSTRATES

(71) Applicant: Southwire Company, LLC, Carrollton, GA (US)

(72) Inventors: Rick Anderson, Toledo, OH (US); Nathan Anderson, Toledo, OH (US); Gregory Baden, Toledo, OH (US)

(73) Assignee: Southwire Company, LLC, Carrollton, GA (US)

(*) Notice: Subject to any disclaimer, the term of this patent is extended or adjusted under 35 U.S.C. 154(b) by 0 days.

(21) Appl. No.: 17/174,443

(22) Filed: Feb. 12, 2021

Related U.S. Application Data

(63) Continuation of application No. 16/819,839, filed on Mar. 16, 2020, now abandoned, which is a continuation-in-part of application No. 16/743,710, filed on Jan. 15, 2020, now abandoned, which is a continuation-in-part of application No. 16/355,173, filed on Mar. 15, 2019, now abandoned.

(51) Int. Cl.
*D06B 5/02* (2006.01)
*D06P 3/24* (2006.01)

(52) U.S. Cl.
CPC ................ *D06P 3/241* (2013.01); *D06B 5/02* (2013.01); *D10B 2331/02* (2013.01)

(58) Field of Classification Search
CPC ........ D06P 3/241; D06B 5/02; D10B 2331/02
USPC ....................................................... 8/115.56
See application file for complete search history.

(56) References Cited

U.S. PATENT DOCUMENTS

| | | | |
|---|---|---|---|
| 1,887,851 A | 11/1932 | Hinsky | |
| 1,890,291 A | 12/1932 | Hinsky | |
| 1,944,823 A | 1/1934 | Lamont | |
| 2,248,965 A | 7/1941 | Corkery | |
| 2,499,787 A * | 3/1950 | Sharkey | D06P 3/241 8/636 |
| 2,543,316 A | 2/1951 | Feild, Jr. et al. | |
| 2,766,136 A | 10/1956 | Gray | |
| 2,986,116 A | 5/1961 | Zerwes | |
| 3,225,178 A | 12/1965 | Giot et al. | |
| 3,544,388 A | 12/1970 | Russell | |
| 3,801,359 A | 4/1974 | Polizzano et al. | |
| 3,814,579 A | 6/1974 | Birke et al. | |
| 3,879,973 A | 4/1975 | Godyn et al. | |
| 4,371,371 A | 2/1983 | Smrekar | |
| 4,505,222 A | 3/1985 | Holt et al. | |
| 4,592,107 A | 6/1986 | von der Eltz | |
| 4,697,291 A | 10/1987 | Shepherd et al. | |
| 4,702,744 A * | 10/1987 | Wolff | C09B 67/0073 210/660 |
| 4,708,887 A | 11/1987 | Baxter et al. | |
| 4,812,140 A * | 3/1989 | Russell | D06P 3/241 8/476 |
| 4,825,491 A | 5/1989 | Miyamoto et al. | |
| 5,230,709 A | 7/1993 | Holfeld et al. | |
| 5,897,708 A | 4/1999 | Hsu | |
| 6,044,509 A | 4/2000 | Schrell et al. | |
| 6,430,980 B1 | 8/2002 | Weinhold et al. | |
| 6,443,998 B1 * | 9/2002 | Jones | D06P 1/39 8/404 |
| 6,652,654 B1 | 11/2003 | Propp et al. | |
| 6,733,543 B2 | 5/2004 | Pyles et al. | |
| 7,175,675 B2 | 2/2007 | Pyles et al. | |
| 7,442,877 B2 | 10/2008 | Kamata et al. | |
| 7,611,547 B2 | 11/2009 | Bracken et al. | |
| 7,875,309 B2 | 1/2011 | Kamata et al. | |
| 7,921,680 B2 | 4/2011 | Kaczkowski et al. | |
| 7,968,142 B2 | 6/2011 | Kamata et al. | |
| 8,286,578 B2 | 10/2012 | Leenders et al. | |
| 8,586,135 B2 | 11/2013 | Taniguchi et al. | |
| 8,624,118 B2 | 1/2014 | Kauffman | |
| 8,968,422 B2 | 3/2015 | Tutmark | |
| 9,064,618 B2 | 6/2015 | Kuchta et al. | |
| 2003/0124253 A1 | 7/2003 | Kamata et al. | |
| 2006/0038356 A1 | 2/2006 | Lehtinen | |
| 2006/0230553 A1 | 10/2006 | Thullen et al. | |
| 2014/0250609 A1 | 9/2014 | Tutmark et al. | |
| 2016/0086692 A1 | 3/2016 | Crawford et al. | |

FOREIGN PATENT DOCUMENTS

| | | |
|---|---|---|
| CN | 101139689 | 3/2008 |
| CN | 202594973 U | 12/2012 |
| CN | 202594975 U | 12/2012 |
| CN | 102856007 A | 1/2013 |
| CN | 103508682 | 1/2014 |

(Continued)

OTHER PUBLICATIONS

SACMPH-H, Resin Tech https://www.resintech.com/product/sacmp-h/ Aug. 19, 2025.*

*Primary Examiner* — Amina S Khan
(74) *Attorney, Agent, or Firm* — Merchant & Gould P.C.

(57) ABSTRACT

Provided are methods of continuously imparting a desired characteristic, optionally color, to a linear polymeric substrate with reliability and reproducibility. According to some aspects, a method of continuously bonding an active agent to or into a polymeric substrate may include contacting an active agent solution with a polymeric substrate. Contacting the active agent solution with the polymeric substrate may occur at a treatment temperature and for a treatment time. The active agent solution may have been prepared from a method including diluting the treated active agent precursor solution to form the active agent solution.

18 Claims, 9 Drawing Sheets

(56) References Cited

FOREIGN PATENT DOCUMENTS

| | | | |
|---|---|---|---|
| CN | 103508684 | | 1/2014 |
| CN | 103508685 | | 1/2014 |
| CN | 102856007 B | | 9/2014 |
| DE | 3854608 | | 8/1989 |
| DE | 4308889 | | 6/1994 |
| DE | 10258234 | | 7/2004 |
| EP | 0068775 A1 | | 1/1983 |
| GB | 1327699 | | 8/1973 |
| GB | 1401154 | * | 7/1975 ............... D06P 3/02 |
| GB | 1401154 A | | 7/1975 |
| GB | 1427446 | | 3/1976 |
| JP | 11011802 | | 1/1999 |
| JP | 2003203530 A | | 7/2003 |
| JP | 2009026475 A | | 2/2009 |
| WO | 2009011182 A1 | | 1/2009 |
| WO | 2016038335 A1 | | 3/2016 |

* cited by examiner

A

B

C
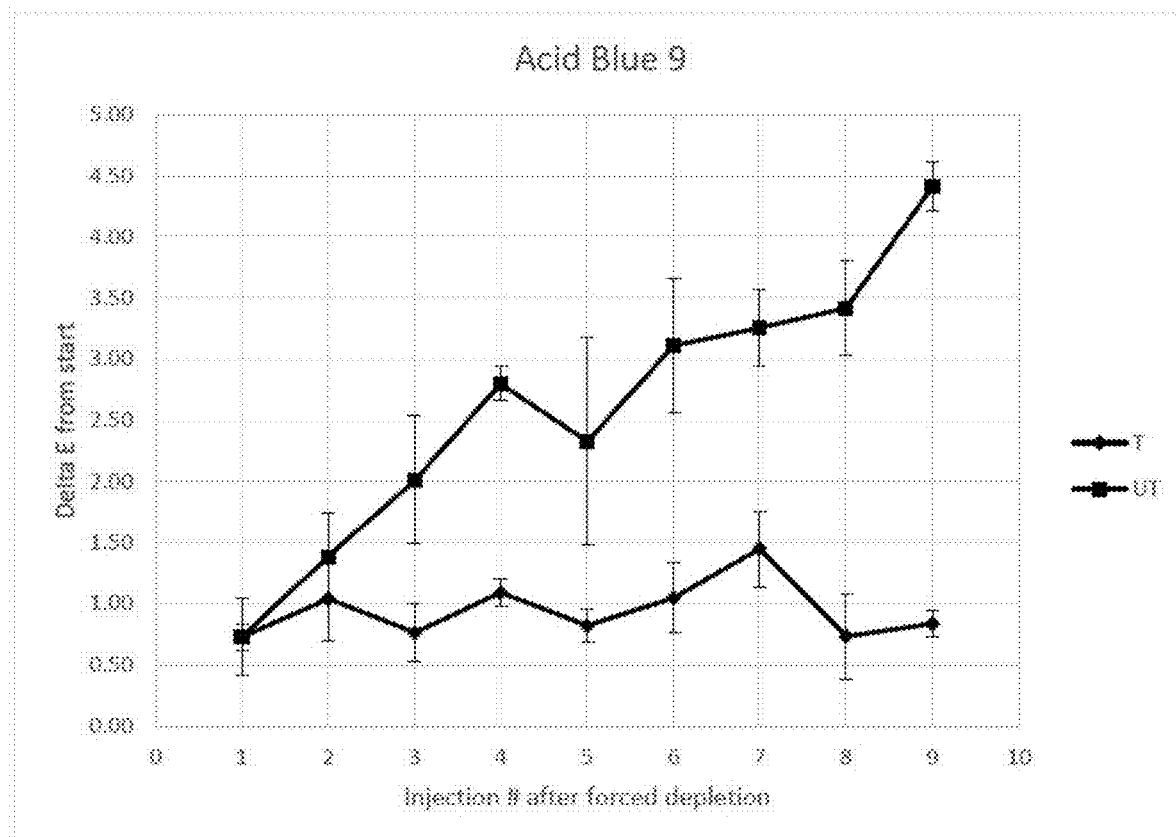
FIG. 8, cont.

METHODS OF IMPARTING COLOR TO NYLON SUBSTRATES

CROSS REFERENCE TO RELATED APPLICATIONS

This application is a continuation of U.S. patent application Ser. No. 16/819,839 filed Mar. 16, 2020, now abandoned, which is a continuation in art of U.S. patent application Ser. No. 16/743,710 filed Jan. 15, 2026, now abandoned, Which depends from and claims priority to U.S. application Ser. No. 16/355,173 filed Mar. 15, 2019, the entire contents of each of which are incorporated herein by reference.

FIELD

The present disclosure generally relates to imparting desirable characteristics to substrates, such as polymeric substrates. The disclosure provides improved methods for adding active agents that impart such characteristics to a polymeric substrate.

BACKGROUND

The inclusion of desirable characteristics to polymeric substrates has historically required a physical association of chemical materials to the substrate during the manufacturing process itself. For example, imparting color to a polymer is historically done by intermixing or compounding pigment or dye particles into a melted polymer either before polymerization or before forming into the final desired shape so that the dye particles can penetrate throughout the material and impart color to the final product.

Such methods have several drawbacks such as the dye particle is subjected to one or more melt/cool cycles during the manufacture of the final article which could result in degradation of the dye and alterations of color relative to that desired. A first heat step is present when the dye is incorporated into the melted polymeric material itself, and a second occurs when the article is formed into the final article shape such as by extrusion or other thermoforming.

Other prior methods of imparting desirable physical or chemical characteristics to polymeric substrates such as color or weathering rely on coating of the final article such as by painting color or other materials onto the surface of the article. Prior processes of producing coated polymeric materials were subject to degradation such as by cracking, peeling, chipping or other that removes all or a portion of the coated material and reveals weaknesses on the overall article. Further, coatings must have sufficient flexibility to maintain integrity on a flexible substrate and such flexibility is difficult to achieve.

As such, there is a desire to develop new methods and systems for imparting desirable physical or chemical characteristics to polymeric substrates such as linear polymeric substrates.

SUMMARY

The following summary is provided to facilitate an understanding of some of the innovative features unique to the present disclosure and is not intended to be a full description. A full appreciation of the various aspects of the disclosure can be gained by taking the entire specification, claims, drawings, and abstract as a whole.

According to aspects of this disclosure, a continuous method of infusing one or more active agent into a polymeric substrate is provided, optionally a polymeric substrate including or formed solely of a polyamide. A method may include contacting an active agent solution with a polymeric substrate whereby the active agent solution may be prepared by the methods as described herein and optionally diluted prior or simultaneous to contact with the polymeric substrate. Contacting the active agent solution with the polymeric substrate may occur at a treatment temperature and for a treatment time. The active agent solution may have been prepared from a method including contacting an active agent precursor solution with a cation exchange resin (CER), optionally in a flow reactor, the contacting forming a treated active agent precursor solution and optionally diluting the treated active agent precursor solution to form and/or replenish the active agent solution during the continuous process. The active agent precursor solution may include an active agent. Diluting the treated active agent precursor solution may form the active agent solution.

BRIEF DESCRIPTION OF THE DRAWINGS

The aspects set forth in the drawings are illustrative and exemplary in nature and not intended to limit the subject matter defined by the claims. The following detailed description of the illustrative aspects can be understood when read in conjunction with the following drawings and in which:

DETAILED DESCRIPTION

Figure 1:
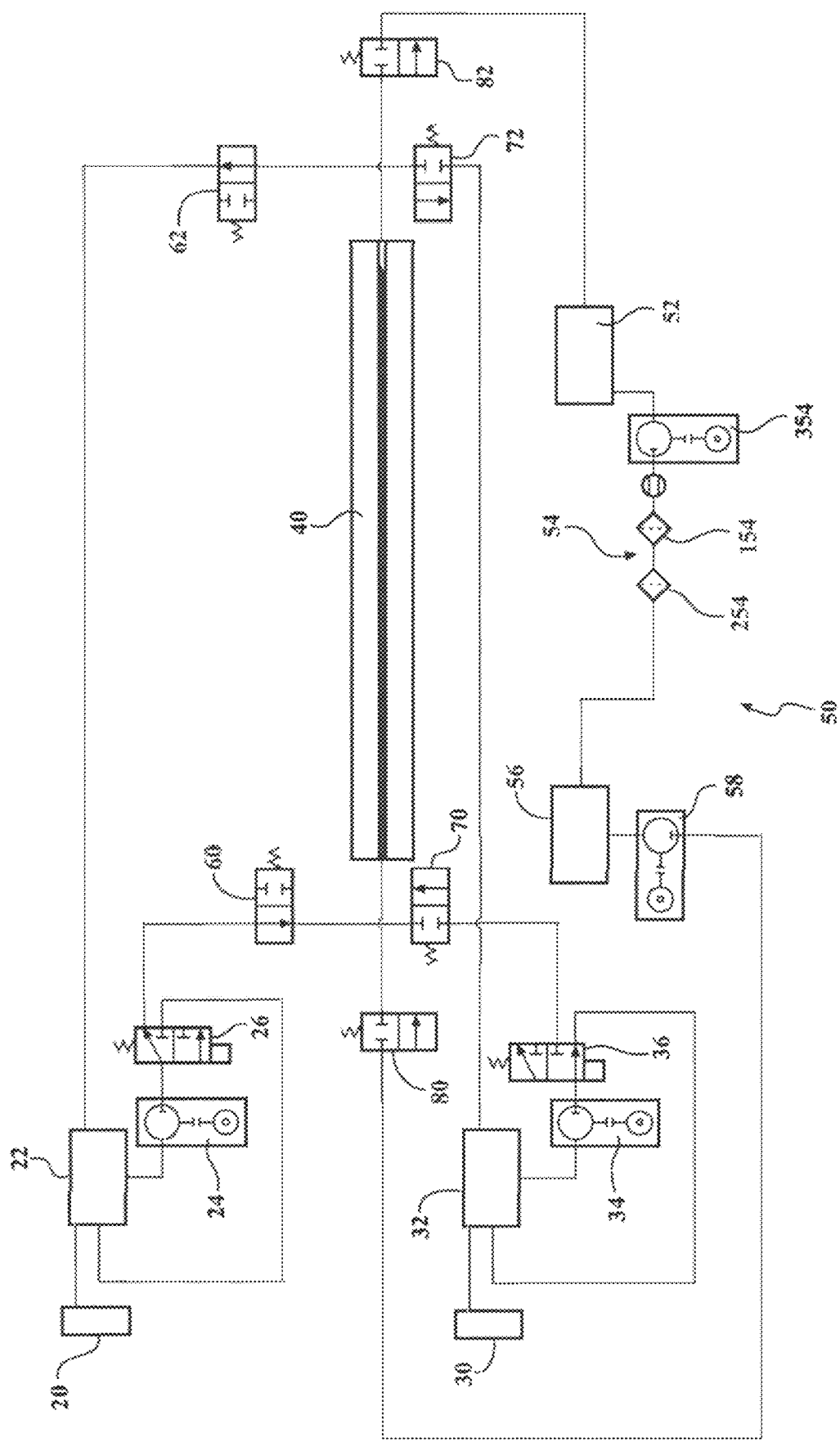
FIG. 1 illustrates schematic layout of the interconnectivity of an exemplary system that can be utilized with an active agent precursor solution that has been converted into an active agent solution for infusion of an active agent into a polymeric substrate.
Figure 2:
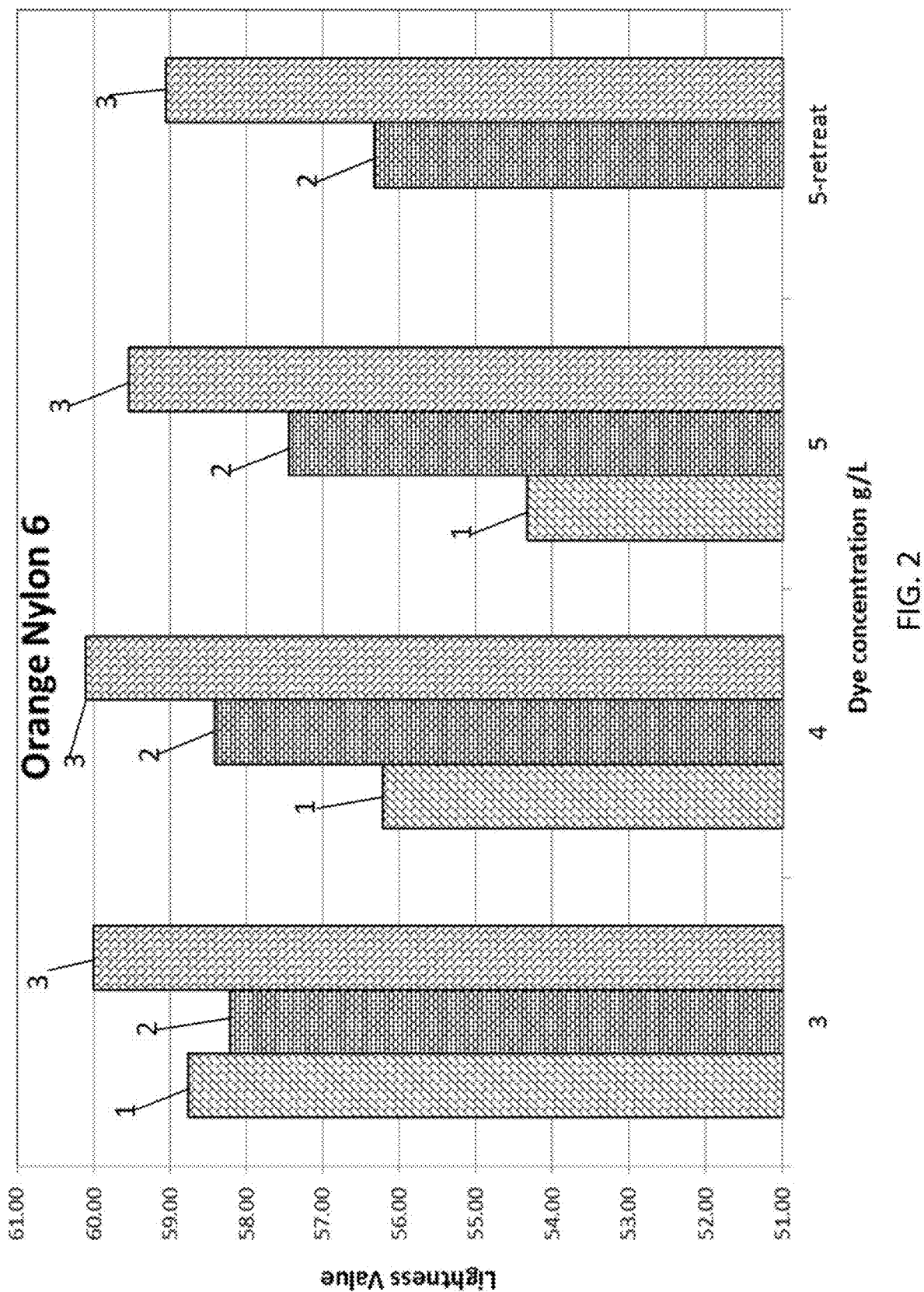
FIG. 2 illustrates the relationship between active agent concentration, method of active agent solution preparation, and ability of the active agent to infuse into the substrate, wherein the active agent is orange dye and the substrate is nylon 6.
Figure 3:
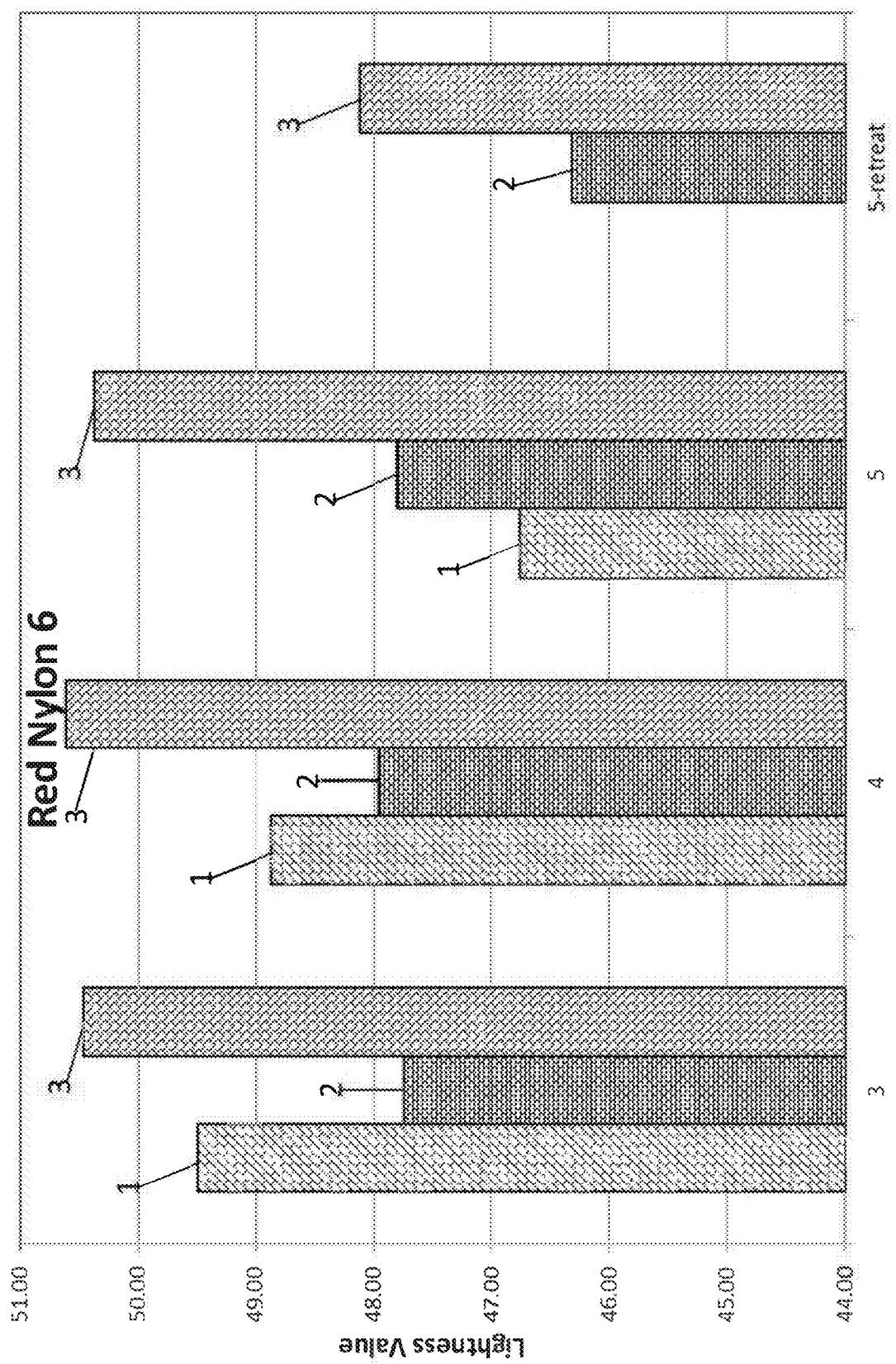
FIG. 3 illustrates the relationship between active agent concentration, method of active agent solution preparation, and ability of the active agent to infuse into the substrate, wherein the active agent is red dye and the substrate is nylon 6.
Figure 4:
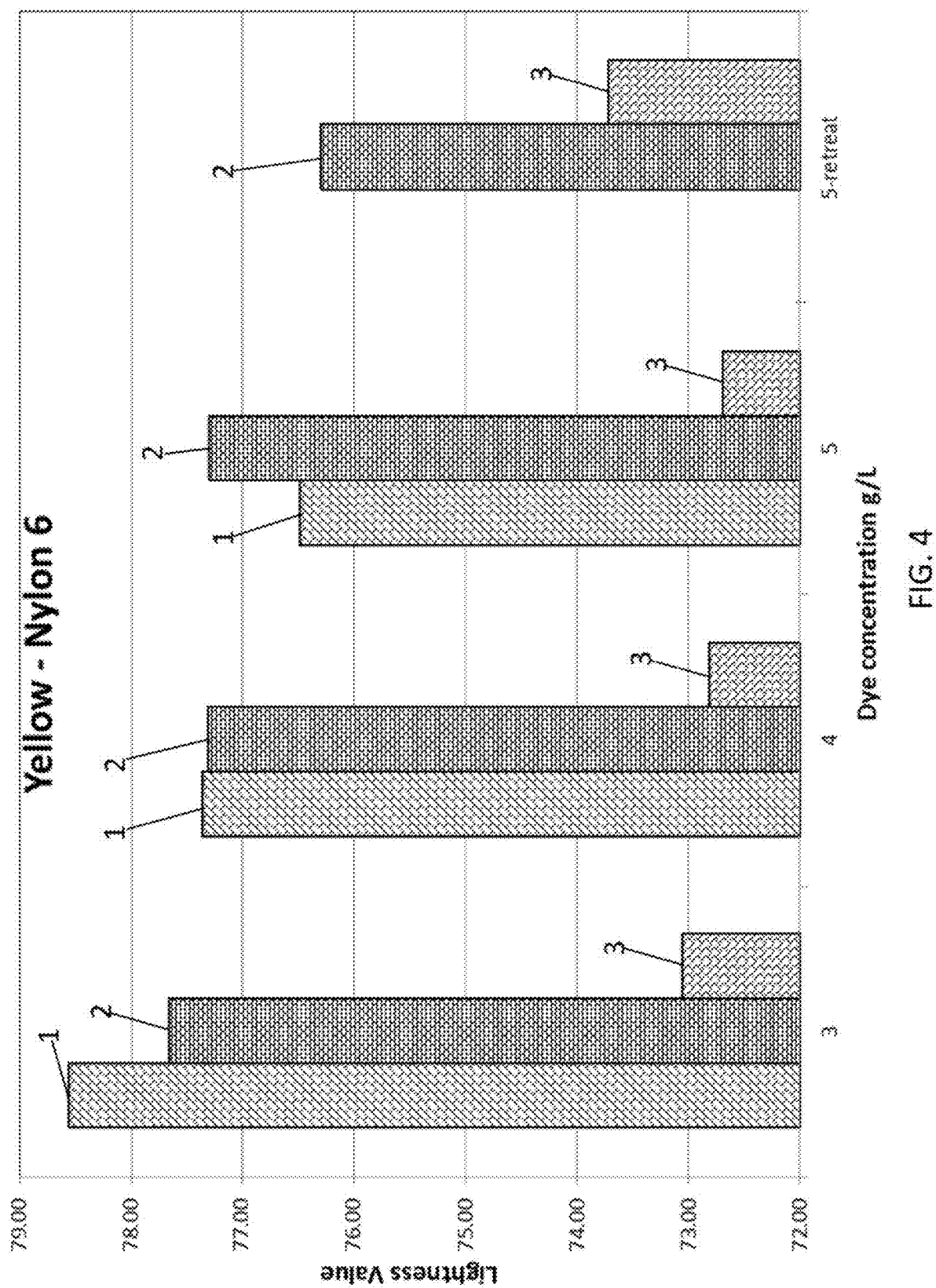
FIG. 4 illustrates the relationship between active agent concentration, method of active agent solution preparation, and ability of the active agent to infuse into the substrate, wherein the active agent is yellow dye and the substrate is nylon 6.
Figure 5:
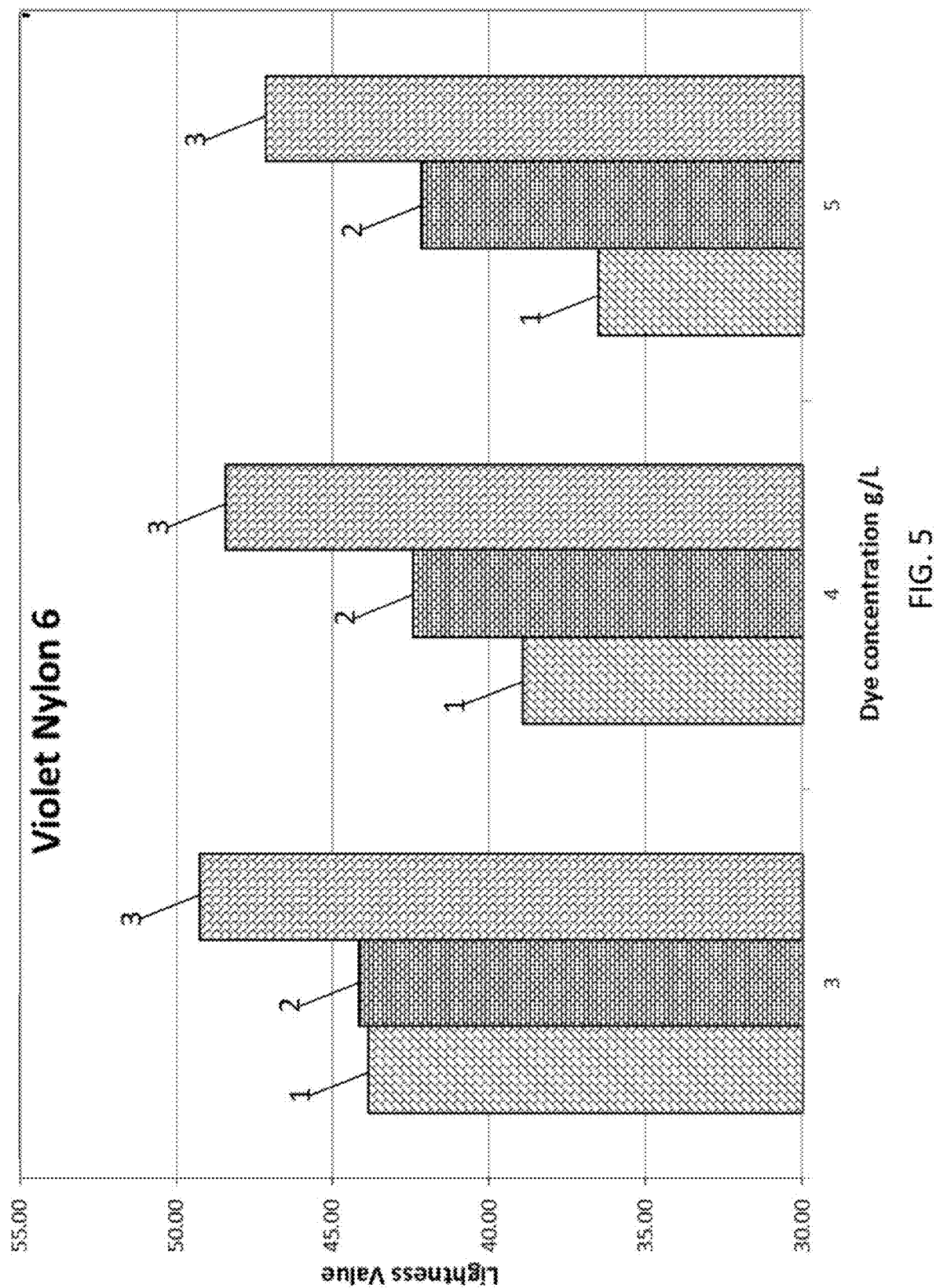
FIG. 5 illustrates the relationship between active agent concentration, method of active agent solution preparation, and ability of the active agent to infuse into the substrate, wherein the active agent is violet dye and the substrate is nylon 6.
Figure 6:
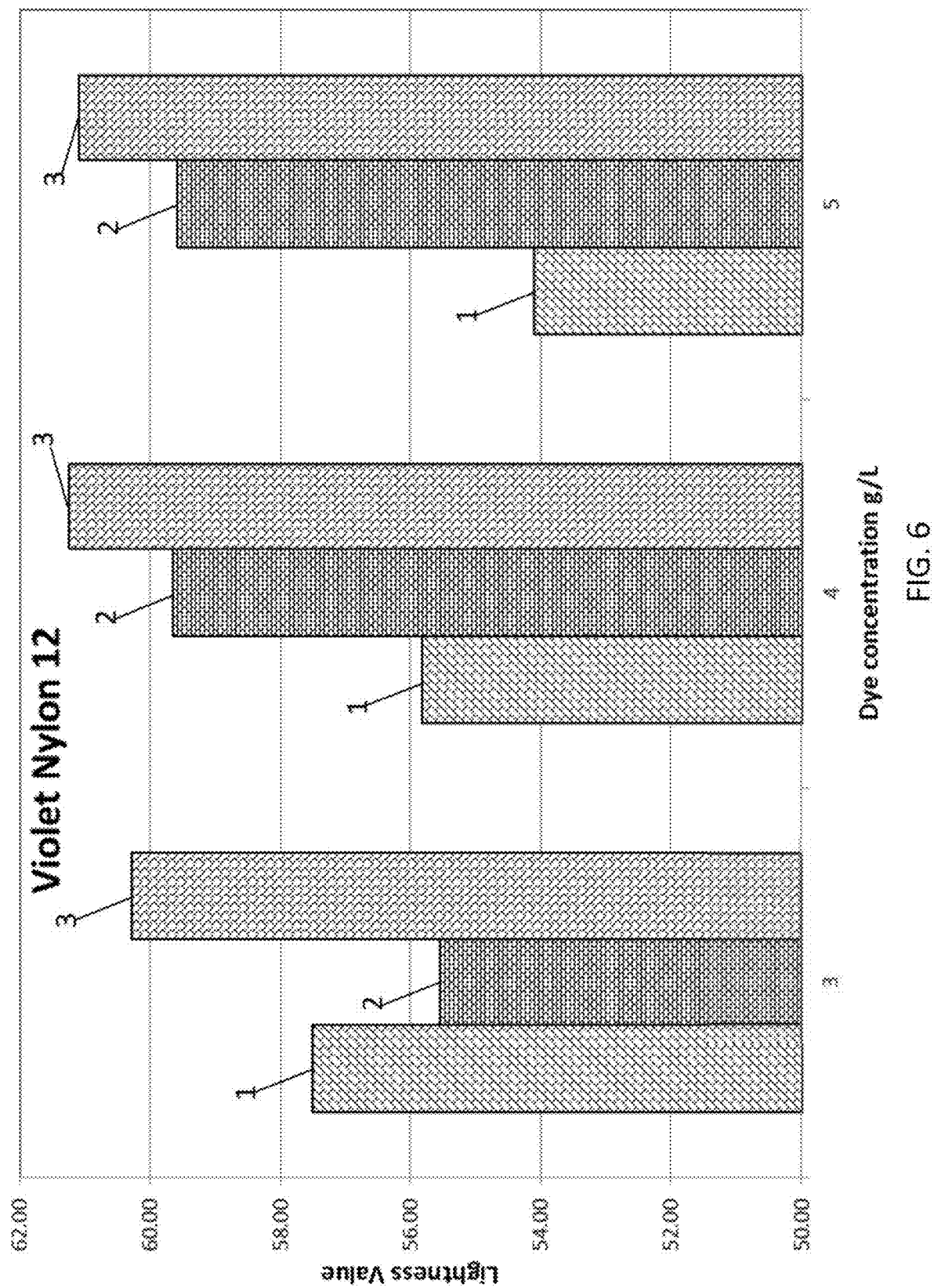
FIG. 6 illustrates the relationship between active agent concentration, method of active agent solution preparation, and ability of the active agent to infuse into the substrate, wherein the active agent is violet dye and the substrate is nylon 12.
Figure 7:
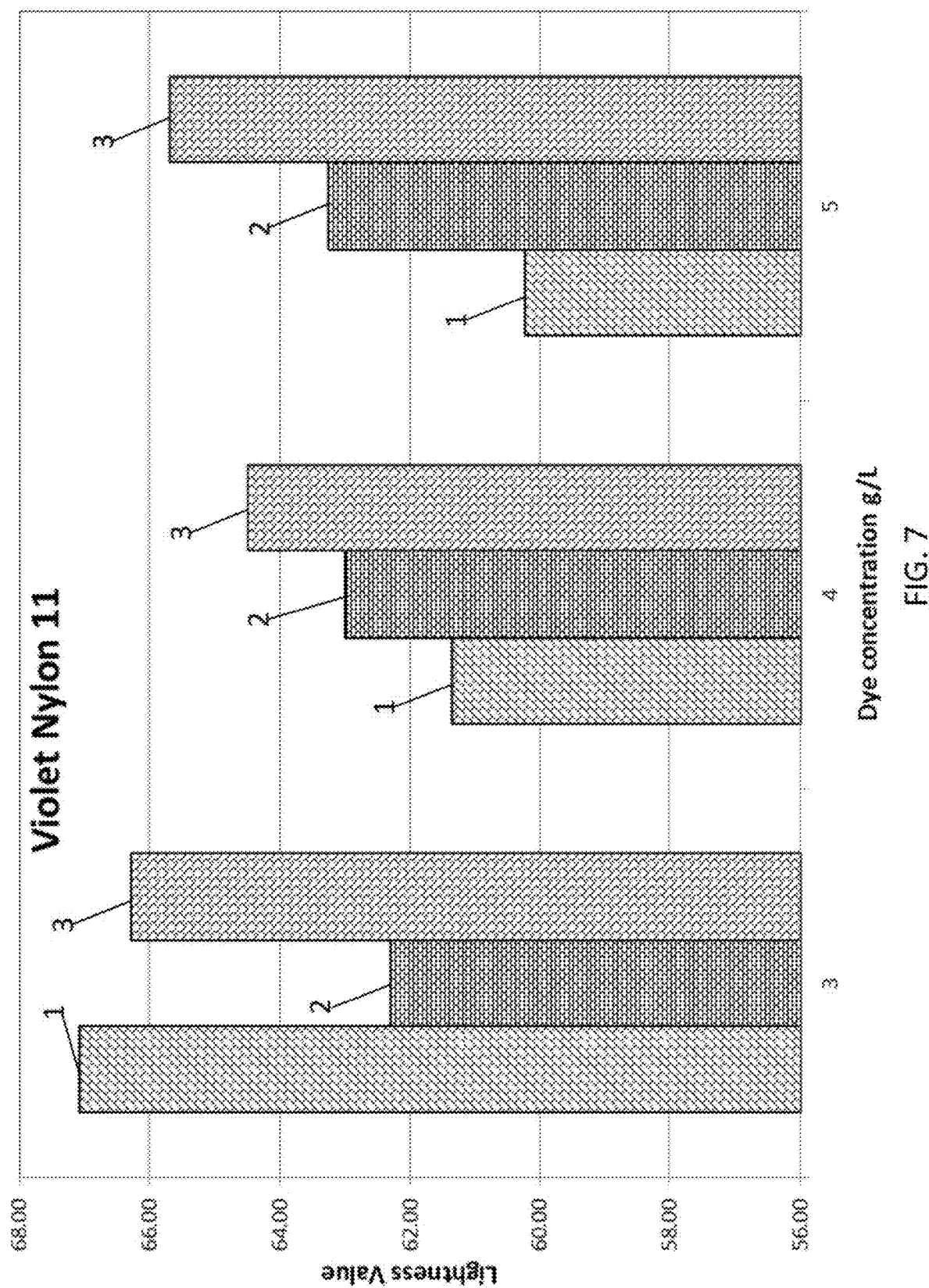
FIG. 7 illustrates the relationship between active agent concentration, method of active agent solution preparation, and ability of the active agent to infuse into the substrate, wherein the active agent is violet dye and the substrate is nylon 11.

As described herein, various aspects provided are methods of imparting desirable characteristics to polymeric materials that are exemplified herein as polyamide containing substrates. It was found that by treating a concentrate of an active agent solution with a cation exchange resin (CER), the amount of dye (e.g. concentration) required to impart robust color or other physical characteristics to a polyamide polymeric substrate in a continuous coloring process is dramatically reduced relative to the same dyes when provided in untreated form and the resulting color more uniform and reproducible. In other particular examples, it was found that the CER treatment of a concentrated solution of dye relative to that used to actually color a substrate was surprisingly more effective than treatment with the same CER of the dilute solution of dye, indicating that in some aspects, pretreatment of a concentration prior to dilution of the dye results in improved contact of the dye to or into the polymeric substrate. In other particular examples, it was found that CER treatment of a solution of dye in a flow reactor, such as a column reactor, was surprisingly more effective than batch treatment with the same CER, indicating that in some aspects, treatment of a solution of dye in a flow reactor results in improved contact of the dye to or into the polymeric substrate. As such, the methods as provided herein are capable of dramatically improving contact of active agent(s) to or into a polymeric substrate.

It will be understood that, although the terms "first," "second," "third" etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second (or other) element, component, region, layer, or section without departing from the teachings herein.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

Unless otherwise defined, all terms (including technical and scientific terms) used herein have the same meaning as commonly understood by one of ordinary skill in the art to which this disclosure or relevant portion thereof belongs. It will be further understood that terms such as those defined in commonly used dictionaries, should be interpreted as having a meaning that is consistent with their meaning in the context of the relevant art and the present disclosure, and will not be interpreted in an idealized or overly formal sense unless expressly so defined herein.

This description is primarily directed to the formation of treated active agent precursor solutions and further directed to the contact of active agents to or into a polymeric substrate. According to some embodiments, the method of forming treated active agent precursor solutions may include contacting an active agent precursor solution with a cation exchange resin (CER), the contacting forming a treated active agent precursor solution. The active agent precursor solution may include an active agent, such as, a dye.

A "continuous" process as described herein is defined as a continual and renewed use of an active agent solution as defined herein for contacting a substrate for a contact time such that the depletion of active agent during the contact time may be renewed by the addition of active agent precursor solution to renew or maintain the concentration of active agent in the active agent solution where without such addition, the concentration of active agent would otherwise be depleted. The continuous use refers to continual use of the same active agent solution such that the active agent is not appreciably depleted during contact with the linear substrate. As such, continuous as used herein is related to the continual use of the active agent solution in a condition to be capable of continually being able to treat a substrate as if the active agent solution were fresh during the contact time or until the entire desired length of linear substrate is effectively treated.

A process may include treating an active agent or an active agent precursor solution, such a dye solution, with one or more cation exchange resins when the active agent is in solution at a concentration that is greater than the concentration of the active agent when contacting the polymeric substrate. It was found that treating a concentrated aqueous solution of dye with one or more CER and then subsequently diluting that concentrated aqueous solution of dye to form an active agent solution, the amount of dye necessary in that active agent solution was dramatically reduced to impart the same level of characteristic (optionally color) relative to simply directly batch treating the active agent solution with one or more CER. Moreover, it was found that the ability to impart color with less variability in color over time was achieved by pretreating a concentrated solution of dye prior to formation of an active agent solution. Similarly, the results are dramatically improved when using acid dyes relative to prior methods that included acid such as acetic acid (or other acid) or batch processing of a dye solution to reduce the pH of the active agent solution. Thus, a process optionally includes formation of an active agent precursor solution (optionally concentrated aqueous solution of dye) and subjecting the active agent precursor solution to treatment with one or more CER. Is should be understood that the solution of active agent at a concentration greater than the concentration used when contacting the polymeric substrate is referred to as an "active agent precursor solution" before treatment, and "a treated active agent precursor solution" after contact with the CER.

An active agent precursor solution is optionally contacted with (e.g. flowed through) a CER 1, 2, or more times. Optionally, the active agent precursor solution is contacted to a CER 1 time and only one time prior to contacting a polyamide material.

Optionally, the active agent precursor solution is contacted with the CER in a flow reactor. Optionally, the flow reactor is a column of CER. Optionally, the active agent precursor solution is contacted with the CER in one or more of a batch reactor, a flow reactor, a semi-batch reactor, a continuously stirred tank reactor (CSTR), a plug flow reactor, a fixed bed reactor, a fluidized bed reactor, or any other type of reactor suitable for solid/liquid interactions.

An active agent precursor solution is treated with one or more CER types. Treating an active agent precursor solution means contacting the active agent precursor solution with the CER either in batch form or by flowing the active agent precursor solution through a column of CER per standard techniques. It is believed that any cation exchange resin is functional. A CER is optionally strongly or weakly acidic depending on the type of functional group provided on the resin. It is further believed that a CER may have a mixed strongly and weakly acidic character. Optionally, a functional group is strongly acidic such as is imparted by the presence of sulfonic acid functional groups among others. Optionally, a functional group is weakly acidic, such as that imparted by a carboxylic acid functional group, or hydrogen form. More specific examples of such CER are polystyrene sulfonate, sodium polystyrene sulfonate, and polyAMPS.

In some aspects the amount of resin in equivalents is 0.1 to 10 times the moles of active agent exposed to the resin in the active agent precursor solution. Optionally, the amount of resin in equivalents is 0.1 to 10, optionally 0.1 to 10, optionally 0.1 to 5, optionally 0.1 to 3, optionally 1 to 1, optionally 5 to 10, optionally 3 to 10, times the moles of active agent exposed to the resin in the active agent precursor solution. Optionally, the moles of active agent exposed to the resin is equal to or 1-5 times less than the functional equivalent of resin, optionally 1-3 times less, optionally 1-2 times less.

An active agent precursor solution may be treated with a CER for a residence time. As used herein, a "residence time" refers to the mean amount of time that the active agent precursor solution molecules spend in the reactor. A residence time may be from 0.01 seconds (sec) to 100 hours (hr). In some embodiments, a residence time may be from 0.01 sec to 1 hr, optionally from 0.01 sec to 30 minutes (min), optionally from 0.01 sec to 1 min, optionally from 1 sec to 1 min, optionally from 1 min to 10 min, optionally from 10 min to 20 min, optionally from 20 min to 30 min, optionally from 30 sec to 2 min, optionally from 1 sec to 2 min, or any combination thereof.

An active agent precursor solution may be treated with a CER at a residence temperature. A residence temperature may refer to the mean temperature of the reactor walls, or optionally of the CER itself, or optionally of the active agent precursor solution while in the reactor, or any combination thereof. A residence temperature may be from 0 degrees Celsius (° C.) to 100° C., or optionally from 1° C. to 99° C., optionally from 10° C. to 90° C., optionally from 10° C. to 60° C., optionally from 10° C. to 40° C., optionally from 20° C. to 30° C., optionally from 20° C. to 90° C., optionally from 90° C. to 100° C., optionally from 60° C. to 100° C., optionally from 70° C. to 90° C., optionally from 80° C. to 90° C., optionally from 22° C. to 27° C., or any combination thereof.

An active agent precursor solution may include active agents at a concentration that is higher than following dilution to form an active agent solution. Optionally, an active agent precursor solution includes an active agent at or greater than 3 g/L, optionally at or greater than 4 g/L, optionally 5 g/L, optionally 6 g/L, optionally 7 g/L, optionally 8 g/L, optionally 9 g/L, optionally 10 g/L, optionally 15 g/L, optionally 20 g/L, optionally 30 g/L, optionally 40 g/L, optionally 50 g/L, optionally 60 g/L, optionally 70 g/L, optionally 80 g/L, optionally 90 g/L, or optionally 100 g/L.

An active agent precursor solution may be contacted to a CER at a mass concentration of active agents that is higher than the mass concentration of active agents when present as a component of an active agent solution. The active agents in the active agent precursor solution are optionally at a mass concentration relative to the active agents in the active agent solution of greater than 101%, 105%, 110%, 120%, 130%, 140%, 150%, 160%, 170%, 180%, 190%, 200%, 250%, 300%, 350%, 400%, 450%, 500%, 550%, 600%, 650%, 750%, 800%, 900%, 1000%, 5000%, 10000%, 20000%, 30000%, or greater. Optionally, the active agents in the active agent precursor solution are optionally at a mass concentration relative to the active agents in the active agent solution of 200% to 10000%, optionally 200% to 500%.

The active agent precursor solution is optionally an aqueous solution. An aqueous solution as used herein with respect to an active agent precursor solution includes a solvent that is or includes water or a water soluble solvent. Optionally, an aqueous solution is or includes water, ethanol, methanol, or other suitable solvent. Optionally an aqueous solution of active agent precursor solution includes water as the sole solvent. Water may be any water type as provided herein such as purified, deionized, tap water, well water, or other.

The active agent precursor solution is optionally diluted with additional aqueous solvent, the diluting forming the active agent solution. The active agent solution may then be contacted to the substrate for an infusion time and at an infusion temperature suitable to impart the desired characteristics to the substrate by infusing the active agent into the substrate material itself, optionally at a chemical level such as through the formation of a covalent or ionic bond to the substrate material itself.

This description is further directed to the contact of one or more active agents (also referred to herein as "active molecules") such as colored dye(s) or other active agents to or into a polymeric material substrate. A method of contacting an active agent to or into a polymeric substrate may include contacting an active agent solution with a polymeric substrate. The active agent solution may have been prepared from any of the methods described herein.

Any substrate type or shape of polymeric substrate is suitable for use such as hollow, tubular, linear, solid, or multilayer substrates. While the examples as provided herein and description thereof may be directed to linear substrates, such is presented for illustrative and descriptive purposes alone. The disclosure is equally applicable to any substrate shape that includes a polymeric surface material, sometimes referred to herein as "polymeric substrates," such as but not limited to hose or other hollow tubing, solid substrates, multicomponent or multilayer substrates, coated wire, sheeting or films optionally of an elongated nature, among other items recognized in the art. Optionally, a substrate is a linear polymeric substrate.

The disclosure is equally applicable to any linear substrate that includes a polymeric surface material, sometimes referred to herein as "linear polymeric substrates," but is not limited to hose or other hollow tubing, solid linear substrates, multicomponent or multilayer linear substrates, sheeting or films of an elongated nature, among other items recognized in the art. A linear substrate may be continuous for a length that is optionally of 10 feet or longer, optionally of 100 feet or longer, optionally of 1000 feet or longer, optionally of 10,000 feet or longer. The processes and systems provided herein may be used to infuse an active material to a linear substrate that is not limited by length. A continuous linear substrate optionally has a length that is greater than 1000 times or more the maximal cross sectional dimension of the linear substrate. The diameter or other maximal cross section linear dimension of a linear substrate optionally does not exceed 10 cm, optionally 2 cm, optionally 1 cm, optionally 0.5 cm, optionally 0.1 cm, optionally 0.01 cm. The diameter or maximal cross sectional linear dimension (excluding length) of a linear substrate or polymeric material layer thereon is optionally greater than 50 µm, optionally greater than 500 µm, optionally greater than 0.1 cm, optionally greater than 0.2 cm, optionally greater than 1 cm. Accordingly, the diameter or other maximal cross section linear dimension of a linear substrate may be optionally from 500 µm to 10 cm, optionally from 0.1 cm to 2 cm, optionally from 0.2 cm to 1 cm, or optionally within any range within the values recited herein.

While much of this specification is directed to imparting color to a linear polymeric substrate, it is appreciated that agents other than dyes are equally able to be effectively contacted to or into the surface of the polymeric substrate to impart other desired characteristic(s) such as but not limited to anti-weathering illustratively but not limited to imparting UV or other light protection, anti-static, lubricity, among others. Illustrative examples of other such active agents can be found in U.S. Pat. No. 9,718,080. As such, unless otherwise directed herein a "dye" is equally represented by other molecules that impart one or more other desirable physical or chemical characteristics to the final product and may or may not impart a color or color change to the final product.

In some aspects, an active agent is suitable to impart color or a change in color to the linear substrate. In some aspects, the active agent is a dye. The dye used to form a colored linear polymer according to particular aspects is optionally an acid dye. An acid dye is optionally an anthraquinone acid dye, an azo acid dye, a triphenylmethane acid dye, or a premetallized acid dye. Illustrative examples of acid dyes include Acid Blue #60, Acid Blue #260 (Blue RL), Acid Blue #9 (Blue FG, CAS #2650-18-2), Acid Blue #25 (Blue GR, CAS #006408-78-2), Acid Blue 1 (CAS #129-17-9), Acid Red #151 ((5Z)-5-[(2-methoxy-5-methyl-4-sulfonatopheny)hydrazinylidene]-6-oxonaphthalene-2-sulfonate), Acid Red #407 (Red 407, CAS #146103-68-6, i.e., Rubine S3G), Acid Red #337, Acid Red #151 (CAS 6406-56-0), Mordant Red 7 (CAS 3618-63-1), Acid Red #1 (i.e., Acid Red G; azophloxine), Acid Red #87 (CAS 548-26-5), Acid Black #2, Acid Yellow #23, Acid Yellow #43 (i.e., Yellow R), Acid Yellow #36 (3-((4-(phenylamino)phenyl)azo)-benzenesulfonicacimonosodium salt), Acid Yellow #232 (CAS 134687-50-6), Acid Orange #144 (i.e., Orange SR 125%; CAS #72797-02-5), Acid Orange #7 (Fast Orange YA, CAS #633-96-5), Acid Black #107 (CAS 12218-96-1), Acid Green 25 (Green G, CAS #4403-90-1), Acid Green 3 (CAS #4680-78-8), Acid Violet #90 (trisodium bis[4-[(4,5-dihydro-3-methyl-5-oxo-1-phenyl-1H-pyrazol-4-yl)azo]-3-hydroxynaphthalene-1-sulphonato(3-)]chromate(3-)), and Acid Violet #17 (i.e., 3-[[4-[[4-(diethylamino)phenyl]-4-[ethyl-[(3-sulfonatophenyl)methyl]azaniumylidene]cyclohexa-2,5-dien-1-ylidene]methyl]-N-ehtylanilino]methyl] benzenesulfonate; Violet Crude, CAS #61916-41-4).

Provided in some aspects are processes for contacting an active agent to or into a polymeric substrate. A process can include contacting a polymeric substrate that can be used for any of a number of purposes such as for conducting, transmitting, or transporting a fluid, electrical energy, light energy, or other. A process employs an aqueous solvent system for contacting one or more desired active agents to or into the surface of a polymer to thereby create a surface that has the desired characteristic such as color or other. In one specific example, the active agent could be a dye or other pigment. In one example, the linear polymeric substrate can be a wire jacket with a typical uncolored outer surface. The wire jacket may have one or multiple polymer coatings consisting of one or multiple polymers. In one example, the wire jacket can be white, gray or other background color as is produced or desired to be produced prior to contact with the desired active agent.

In some aspects, the contact of one or more active agents can be employed on previously manufactured source substrate material. For example, after the formation of a polymer in the desired configuration (e.g. hollow, solid, coating a core, such as in the case of a wire, or other), the substrate could be immediately colored using the processes and systems discussed herein or previously manufactured substrate could be colored using the processes and systems discussed herein. In particular aspects, color is contacted to or into pre-manufactured substrate, optionally on an as-needed basis. In other aspects, color is contacted to or into the substrate material within moments (e.g. less than 1 minute) following extrusion.

A substrate optionally includes or is an outer layer that includes one or more polyamide polymeric materials. Exemplary illustrative examples of a polymeric material include polyamides. In particular aspects, the polymeric material is a polyamide known as nylon. In some particular aspects, the polymeric material is or includes a polyamide. Optionally, a polymer is a homopolymer, a copolymer or a reinforced polymer as long as the polymer includes one or more polyamides. Illustrative examples of a polyamide include nylon 6 nylon 66, nylon 6/6-6, nylon 6/9, nylon 6/10, nylon 6/12, nylon 11, nylon 12, among others, or any combination thereof.

Processes of coloring a linear substrate having at least an outer layer of one or more polyamide materials includes contacting an active agent to or into a linear polymeric substrate optionally by: providing a polymeric material optionally in the form of a linear substrate; mixing, immersing, coating or otherwise contacting the polymeric material with an active agent solution at a treatment temperature optionally below the melting temperature of the polymeric material and for a treatment time, the active agent solution including one or more dye and/or other active agents that has been pretreated with one or more cation exchange resins prior to contact with the polymeric substrate and, optionally, one or more additional agents (e.g. salt), the one or more dye and/or other active materials optionally imparting a color change to the polymer relative to a like polymeric material that is not contacted with the one or more active materials, the one or more active agents operable to promote bonding of the active agent to or into the surface of the polymeric material; and contacting the active material to the polymer material by said mixing, immersing, or coating step thereby forming a dyed linear polymeric substrate. Optionally, contacting or bonding is achieved by a process that excludes spraying. Optionally, a process includes moving a linear polymeric substrate through an active agent solution at a rate such that the active agents will effectively bond to or into the surface of the polymeric substrate.

According to some aspects as provided herein a process of coloring a linear substrate is a continuous process. A continuous process is one wherein the linear substrate has sufficient length such that dye in the active agent solution is diluted to enough of an extent that during the coloring process the output linear substrate has a color differential measureable by a camera and associated color monitoring system. In the continuous process, additional active agent precursor solution must be added to return the color output of the linear substrate to within desired predetermined color parameters as also measured by the camera and associated color monitoring system. As such, a continuous system is capable of operating beyond exhaustion or acceptable tolerances of dye amount or concentration in an active agent solution. The addition of subsequent amounts of active agent precursor solution, optionally by contact with water, optionally by dilution with the existing active agent solution, refreshes the active agent solution to allow the continuous process to proceed.

As such, a process of contacting an active agent to a synthetic polyamide polymeric substrate is optionally a continuous process. It was unexpectedly found that by using an active agent precursor solution prepared as provided herein, the reliability of producing a stable output characteristic (e.g. coloring) of the linear polymeric substrate dramatically improved. This improvement could not be reproduced by other methods of treating active agent precursor solution or active agent precursor solution. As such, the amount of active agent precursor solution was found to effectively correlate with the desired change in color (or other characteristic) imparted to the linear polymeric substrate only when an active agent precursor solution prepared as described herein is used to replenish the active agent in an active agent solution during a continuous process.

Illustrative examples of a continuous coloring processes suitable for use with the active agent precursor solution as prepared herein are described in U.S. Application Publication No: 2019/0093281. Briefly, a linear polymeric substrate is led to and run directly through a process chamber optionally without contact to any side of the processing chamber such that the active agent solution can fully or partially surround the linear polymeric substrate and may uniformly infuse the substrate with the active agent during the treatment time. The linear polymeric substrate is maintained in the process chamber for a treatment time and treatment temperature sufficient to ensure that the active agent in the active agent solution is infused into the linear polymeric substrate to a desired depth, hue, opacity or other characteristic.

A treatment temperature is optionally below the glass transition temperature (Tg) of the polymeric material of the linear substrate, optionally below the melting temperature of the polymeric material. In some aspects, the treatment temperature is above the Tg. Optionally, the treatment temperature is at or above the Tg and below the melting temperature. For amorphous thermoplastic materials without true melting points, a treatment temperature is optionally above the Tg but is not so high that the article shape is affected. A treatment temperature is the temperature of the active agent solution, the polymeric substrate or both during the treatment process. In some aspects, a treatment temperature is from 60 degrees Celsius to 98 degrees Celsius, optionally 81 degrees Celsius to 91 degrees Celsius. In some aspects, a treatment temperature is from 60 degrees Celsius to 99.9 degrees Celsius, optionally 90 degrees Celsius to 99 degrees Celsius. Optionally, a treatment temperature does not exceed 100 degrees Celsius. Optionally, a treatment temperature does not exceed 99 degrees Celsius. Optionally, a treatment temperature is between 81° C. and 99° C. Optionally, a treatment temperature is ambient temperature (about 25° C.) to 99° C. Illustratively, for a polyamide thermoplastic material a treatment temperature is optionally about ambient temperature to 99° C., or 90° C. to 99° C. Optionally, a treatment temperature is 20° C. to 40° C., optionally 10° C. to 99° C.

A substrate is contacted to an active agent solution for a treatment time. A treatment time is optionally 1 minute or less, optionally at or between 0.01 second to 1 minute. The substrate is optionally contacted with an active agent by immersing a linear polymeric material in an active agent solution for a treatment time. In some aspects, spraying an active agent solution onto the linear substrate is excluded. A treatment time is optionally any time from <1 second to 120 minutes, or more. In some aspects, a treatment time is optionally from 0.001 second to 30 minutes, optionally from 0.001 seconds to 20 minutes, optionally from 0.001 seconds to 10 minutes, optionally from 0.001 seconds to 1 minute, optionally from 1 second to 1 minute, optionally from 5 seconds to 1 minute, optionally from 5 seconds to 30 seconds, optionally from 10 seconds to 20 seconds, optionally 2 to 10 seconds, optionally 3 to 6 seconds. A treatment time is optionally 1, 2, 3, 4, 5, 6, 7, 8, 9, 10, 15, 20, 25, 30, 35, 40, 45, 50, 55 or 60 milliseconds. A treatment time is optionally 1, 2, 3, 4, 5, 6, 7, 8, 9, 10, 15, 20, 25, or 30 seconds. In some aspects, a treatment time is less than one min, optionally from 0.01 second to 1 minute, or any value or range therebetween. In some aspects, a treatment time is from 0.1 seconds to 5 seconds or from 0.25 seconds to 3 seconds.

A polymer used in the processes optionally is or includes a polyamide such as a nylon. The active material following treatment with the active agent optionally penetrates the polymer to a depth of less than 2 millimeters, optionally to less than 1 millimeter. In some aspects, an active agent is present in or on a polymeric substrate to a final depth of less than 200 microns. Optionally, an active agent is bonded on the surface and does not penetrate the surface of the polymeric material. In some aspects, the polymer is preheated to the infusion temperature prior to contact with an active agent solution and/or dye material. Optionally, the active agent solution and/or dye material is heated to the treatment temperature and an unheated polymer is immersed, mixed, or otherwise contacted with the active agent solution.

A dye supply tank including additional active agent precursor solution may be fluidly connected to a portion of the active agent solution such that a desired amount of active agent precursor solution may be added to the active agent solution to replenish the active agent depleted by contact with the linear polymeric substrate. As such, a continuous process is achievable with robust, reproducible, and reliable infusion of the one or more active agents throughout the length of the linear polymeric substrate.

Optionally, a continuous process is capable of infusing one or more active agents into a linear polymeric substrate of any desired length and for any time. Optionally, a continuous process is capable of infusing one or more active agents into a virgin length(s) of linear polymeric substrate for 10 minutes, 30 minutes, 60 minutes, 2 hours, 3, hours, 5 hours, 10 hours, 24 hours, 2 days, 5 days, 10 days or more.

During the continuous processes as provided herein, a reliability showing a surprisingly low Delta E (ΔE) is achieved. ΔE is s a single number that represents the distance between two colors. For example, a ΔE will be present when a color drift is observed during a continuous run due to depletion of dye in an active agent solution or other possible issues. The processes as provided herein are capable of maintaining a ΔE throughout the entire continuous time process time of less than 10. In some aspects, a ΔE during the entire continuous process is equal to or less than 9, 8, 7, 6, 5, 4, 3, 2, or 1. In particular aspects, a ΔE is less than 2 during an entire continuous process run. In particular aspects, a ΔE is equal to or less than 1 during an entire continuous process run. Determination of ΔE may be camera and color monitoring processes as known in the art. Illustratively, L*a*b* values may be obtained and ΔE calculated as compared to undyed material, a prior time, or other. The L*a*b* values determined may be in the CIELAB color space.

In contrast to prior methods, it was found that solvents other than an aqueous solvent are unnecessary to impart more effective bonding of an active agent to or into a polymeric material. As such, an active agent solution solvent other than water is optionally absent in the system. As such, an active agent solution is optionally an aqueous solution. An active agent solution is optionally entirely formed of water and an active material. In some aspects, the water is tap water. The active agent solution optionally excludes one or more additives used in prior methods such as one more surfactants or emulsifiers. An active agent solution optionally includes one or more dyes or other active agents to be infused into the polymeric substrate. For example, in some aspects, the active agent solution consists essentially of a dye and water, and optionally a salt. As another example, in some aspects, the active agent solution consists essentially of a dye and water. In any of these aspects, the water may be tap water, optionally of the composition delivered in Toledo, OH. In some aspects, the active agent solution is a liquid.

An active agent solution optionally includes one or more salts. In some aspects a salt is present at a concentration of 0.1 to 0.5 g/L. A salt concentration is optionally greater than 0.1 g/L and less than 0.5 g/L. Optionally a salt concentration is 0.1 g/L to 0.3 g/L. A salt concentration is optionally 0.1 g/L, 0.2 g/L, 0.3 g/L, 0.4 g/L, or 0.5 g/L. A salt is optionally a sodium salt, potassium salt, or other. In some aspects a salt is optionally a salt of Na, K, Ca, Mg, or combinations thereof.

In some aspects, the active agent solution consists or consists essentially of water, optionally a salt, and a dye selected from the group consisting of Acid Red 407, Acid Blue 260, Acid Orange 144, Acid Red 1, Acid Red 151, Acid Yellow 43, Acid Yellow 36, Acid Yellow 232, Acid Violet 90, Acid Red 201, Mordant Red 7, and Acid Black 107.

A colored or other polymeric material is optionally formed by employing techniques from any of several processes. In some aspects, linear polymeric material is colored using a device as described in U.S. Pat. No. 9,718,080. In some aspects, a device such as that described in WO/2017/193031 is used.

The systems and methods described herein may be used to impart color or other desired physical or chemical characteristic into a linear polymeric substrate by a process that may include bonding an active agent to or into a linear substrate at a treatment temperature.

In some aspects, the treatment time is sufficient to enable the active agent(s) to infuse into the surface or penetrate the surface of the linear polymeric material to a depth of less than 1 millimeter. In some aspects, the treatment time is sufficient to enable the active agents to infuse to the surface or penetrate the surface of the linear polymeric material to a depth of less than 200 microns. Accordingly, in some aspects, the active agents penetrate the surface of the linear polymeric material from 1 micron to 1 millimeter, from 5 microns to 500 microns, from 10 microns to 250 microns, or from 20 microns to 200 microns. In other aspects, the active agents bind to the surface of the linear polymeric substrate, optionally through covalent bonding, hydrogen bonding, ionic bonding, by van der Walls interactions, or combinations thereof.

The following provides exemplary description of a linear substrate active agent infusion system ("system") suitable for bonding an active agent (e.g., dye) into or onto the surface of a linear substrate. It is appreciated that one or more of the colored dyes as the active in an active agent solution used in the following description are substitutable with one or more other active agents to be bonded to the linear substrate. Throughout this disclosure the system is referenced as having a first colored dye and a second colored dye appreciating that colored dye is equally substitutable with another active agent to be infused to the linear substrate. Limitation of discussion to two colored dyes is for ease of discussion and simplicity. It will be appreciated that aspects of the system may include 3 or more colored dyes by replicating one or more elements of the associated systems of the first or second colored dye for each additional colored dye added to the system.

FIG. 1 illustrates a schematic layout of the interconnectivity of an exemplary system that can be utilized with an active agent precursor solution that has been converted into an active agent solution for infusing of an active agent to a polymeric substrate. A generalized system configured for two active agent solution options includes a first dye supply 20 for providing first active agent precursor solution and a second dye supply 30 for providing a second active agent precursor solution. The first dye supply 20 and second dye supply 30 are attached to a first process tank 22 and a second process tank 32 respectively. The process tanks 22, 32 each provide a reservoir of active agent solution for circulation through the system. The first process tank 22 and the second process tank 32 each are fluidly connected to a process chamber 40. The process chamber 40 contacts the desired active agent solution with the substrate to color the outer surface of the substrate by infusing the active material (e.g., the dye) to or into the substrate surface. Upon exiting the process chamber 40 the active agent solution is optionally returned to the first process tank 22 or the second process tank 32 for the respective color from which the colored dye originated. Propulsion of the first active agent solution and the second active agent solution is provided by a first dye pump 24 and a second dye pump 34 respectively. A process tank is optionally formed of one or more non-reactive materials, optionally stainless steel. A non-reactive material is one that will not cause degradation of an active agent solution or any component therein or the linear substrate during an infusion time.

The system is unique in providing a replenishable supply of active agent during a possible continuous coloring process. The dye supplies can house an active agent precursor solution that has or has not been treated with CER. At a rate that is desired or required due to depletion of the active agent by infusion into a polymeric substrate, additional active agent can be supplied to the process tank to maintain the same level (e.g. concentration) of active agent that is contacted with the polymeric substrate over time. Optionally, the dye supply includes an active agent precursor solution that has or has not been treated with a CER. Optionally, the dye supply includes an active agent precursor solution that has been treated with a CER. In alternative aspects, a dye supply includes an active agent precursor solution that has not been treated with a CER but in the line between the dye supply and the process chamber may be a column, or other suitable configuration, of CER such that the active agent precursor solution passes through the CER prior to dilution in the process tank. This in all circumstances allows an active agent precursor solution to be treated with CER in concentrated form thereby improving the infusion of the active agent to or into the polymeric substrate.

In one or more aspects, the first process tank 22 and the second process tank 32 are each connected to respective heating loops. The heating loops raise the temperature of the first active agent solution and the second active agent solution to the desired set point for introduction to the process chamber 40 and coloring of the linear substrate. Each heating loop may include an in-line heater to raise the temperature of the first active agent solution or the second active agent solution respectively during passage of the first active agent solution or the second active agent solution through the heating loop. A heating loop is optionally 1 to 10 feet long, optionally 2 to 4 feet long. It is appreciated that the length of the heating loop need only be sufficient to heat the active solution or portion thereof to a desired temperature.

In one or more aspects, the first process tank 22 and the second process tank 32 may be heated tanks. In further aspects, the first process tank 22 and the second process tank 32 may each comprise an agitator or mixer to maintain a uniform temperature and mixture throughout the active agent solution within the first process tank 22 or the second process tank 32. In example, a process chamber may have a length of 7 feet and an internal diameter of 1.5 inches producing a system with a fluid capacity of 0.65 gallons. The dimensions of the process chamber are for exemplary purposes alone, and other dimensions are contemplated.

In further aspects, a filter may be included in the heating loop and/or between the heating loop and process chamber 40 and/or between the process chamber 40 and the process tank 22, 32. When included, the filter serves to filter and remove sediment or unwanted particles that enter the active agent solvent during the coloring operation. An illustration of a filter includes standard bag filters such as Trade Size 3, 316 stainless steel, top feed.

The heating loop allows circulation of the active agent solution when not being provided to the process chamber 40. The heating loop for the first active agent solution optionally includes a first diverter valve 26 and the heating loop for the second active agent solution includes a second diverter valve 36. The first diverter valve 26 and the second diverter valve 36 direct the respective active agent solution on a recirculation pathway in the heating loop when in a first position and direct the active agent solution away from the heating loop to the process chamber 40 when in a second position. Although various aspects described herein include two process tanks and two heating loops, it is contemplated that a greater or fewer number of process tanks and respective heating loops may be included.

The system can be provided with various electronic, mechanical, or other controls for controlling or adjusting one or more parameters of the coloring process or the system itself. For example, an interface for operating the system can be provided. The interface may comprise a graphical user interface (GUI) to allow an operator to monitor and/or adjust process parameters. Illustrative examples of process parameters include a) active agent solution temperature in tank, b) active agent solution temperature in process chamber, c) solvent flow rate, d) position of valves (e.g. open, closed, intermediate), e) speed of linear substrate moving through process chamber, f) control pump on/off, g) active agent solution level in process tanks, h) solvent level in solvent recovery tank, i) solvent level in clean solvent tank, j) solvent level in process tanks, k) solvent temperature in recovery tank, l) temperature setting of process tanks (thermocouple), m) linear substrate footage counter, n) color concentrate level meter, among others.

As shown in FIG. 1, the first process tank 22 and the second process tank 32 are optionally heated to raise the temperature of the first active agent solution and second active agent solution, respectively. In one example, the active agent solution is heated to a temperature of 80° C. to 99.9° C. In another example, the active agent solution can be heated to 90° C. to 99.9° C. Optionally, the active agent solution is heated as close as possible to the boiling temperature of water at 100° C. (1 atm). In one specific example, the active agent solution is heated to approximately 99° C.

The first dye pump 24 and second dye pump 34 pump the first active agent solution from the first process tank 22 and the second active agent solution from the second process tank 32 respectively to the process chamber 40 and back to the first process tank 22 or second process tank 32. The passage of the first active agent solution or the second active agent solution through the process chamber 40 contacts the colored dyes or other active materials in the active agent solution to the linear substrate and results in the dyeing of the polymeric substrate by infusing of the dye(s) to or into the surface of the polymeric substrate. It is also contemplated that the first process tank 22 and the second process tank 32 are connected to the first dye supply 20 and the second dye supply 30 respectively, which are configured to add additional active agent (e.g. colored dye) in the form of an active agent precursor solution as needed to the first and second process tanks 22, 32. However, other methods of active agent addition are also contemplated.

Various aspects of the present invention are illustrated by the following non-limiting examples. The examples are for illustrative purposes and are not a limitation on any practice of the present invention. It will be understood that variations and modifications can be made without departing from the spirit and scope of the invention.

EXAMPLES

Example 1

Various polyamide polymeric materials are subjected to coloring by various acid dyes under three sets of conditions. As a test set, an active agent precursor solution at a dye concentration of 20 g/L in RO water is passed through a column of hydrogen SACMP cation exchange resin from RESIN TECH, INC., West Berlin, NJ. 0.6 g of dye in solution is passed through 0.6 g of SACMP resin to form a treated active agent precursor solution. The active agent precursor solution is then diluted to a concentration of 3 g/L for contact with a nylon substrate. To increase the concentration of the active agent solution to a higher dye level for subsequent testing, additional CER treated active agent precursor solution is diluted into the active agent solution to achieve the new dye concentration in the active agent solution.

A first control set of tests is performed using a batch treatment whereby only an active agent solution is contacted with a CER. In this test a 20 g/L solution of dye is created in RO water. This is then further diluted to 3 g/L in RO water and the diluted material is treated in batch form with the CER prior to contact with the nylon substrate. Additional dye is added from the non-CER treated concentrate to the active agent solution to increase the concentration of the dye to the desired level.

The second control formed solution of RO water at the desired pH (pH 2.89). Powder dye was then added to the pH adjusted RO water to a final dye concentration of 3 g/L for contact with the nylon substrate. This creates a working solution with pH that is substantially identical to the solution of test sample (the CER treated active agent precursor solution diluted into an active agent solution). To reach the 4 and 5 g/L concentrations of dye, additional powder dye was added to the solution.

For all three test types, additional dye concentrate was added per each of the above protocols to the original 3 g/L concentration to reach a 4 and 5 gram concentration of dye for testing. The 5-retreat samples had the same batch of active agent precursor solution retreated with a fresh column of CER prior to dilution.

All three testing protocols are performed using various dyes and various nylon substrates. The dyes tested were Acid Orange 144 (CAS 61814-64-0; Orange), Acid Yellow 36 (587-98-4; Yellow), Acid Red 407 (CAS 146103-68-6; Red), and Acid Violet 90 (CAS 61916-41-4; Violet). Each dye is also tested for infusion to or into the nylon substrates nylon 6, nylon 12, and nylon 11 as differing forms of polyamide polymeric substrate material. The substrates are then subjected to color analyses for color saturation into the material as an indicator of magnitude of infusion of the dye. Wire substrates with white jackets served as the substrates where a high lightness value indicates low infusion. A reduced lightness value is indicative of a formal color change and infusing of the dye to or into the substrate. As is illustrated in FIGS. 2-7 the tests whereby pH was controlled by adjusting the pH of the active agent solution by addition of acetic acid (illustrated by numeral 3) showed the poorest infusion of the dye into the substrate indicating that pH effects are not driving infusion of dye to the substrate. The batch CER treated samples (illustrated by numeral 2) showed improved coloring at all concentrations tested. However, dramatic improvement in coloring was observed for test samples where the concentrated dye was CER treated prior to dilution (illustrated by numeral 1) and subsequent contact with the substrates.

Example 2

Polyamide polymeric materials (nylon 12 or nylon 6) are subjected to coloring by three chemical families of acid dyes under two sets of conditions. The dyes tested were Acid Red 151 (exemplary Azo dye family member), Acid Blue 25, (exemplary anthraquinone dye family member) and Acid Blue 9 (exemplary triphenylmethane family member). Tests are performed using a depletion protocol whereby a nylon sample is colored by immersion in an active agent solution followed by depletion of the active agent solution by dilution to mimic dye depletion as would occur in a continuous coloring process. The colored sample is photographed using a camera followed by measuring the color by taking two L*a*b readings to determine ΔE relative to first colored sample or baseline. The two readings are averaged for a point outcome. Following depletion, a CER-treated dye concentrate or non-CER-treated dye concentrate (control) is added to regain the original concentration as described below and a new sample is colored and measured as above. The non-CER-treated control is treated in batch form (e.g. in line with the coloring) following addition of the non-CER-treated dye concentrate. These studies mimic batch CER treatment inline systems compared to use of CER-treated concentrates to maintain color in a continuous coloring process. Each study is performed in triplicate. Mean and standard deviation at each dilution step are presented in FIG. 8.

As a test set, an active agent precursor solution at a dye concentration of 20 g/L in RO water combined with hydrogen SACMP cation exchange resin from RESIN TECH, INC., West Berlin, NJ. 3.5 g of dye in solution is combined with 3.5 g of SACMP resin to form a treated active agent precursor solution and the SACMP resin removed by straining. The active agent precursor solution is then diluted to a concentration of 2.25 g/L for contact with a nylon substrate. Following dye depletion additional CER-treated dye is added to the system to increase the concentration of the active agent solution to the original dye concentration for subsequent testing.

A control set of tests is performed using a batch treatment whereby only an active agent solution is contacted with a CER. In this test a 20 g/L solution of dye is created in RO water. This is then added to the diluted material and treated in batch form with the CER prior to the subsequent contact with a nylon substrate. For subsequent rounds so as to mimic a continuous color process using batch treatment (treatment of diluted dye), additional dye is added from the non-CER treated concentrate to the active agent solution to increase the concentration of the dye to the desired level and the batch is CER treated at the dye concentration of the dying process. This way the dye concentration remains identical to the test sample. The only difference is that the control is CER treated at the concentration of dye used in the dying process whereas the test is CER-treated in concentrate form and not subsequently CER treated in batch.

Figure 8:
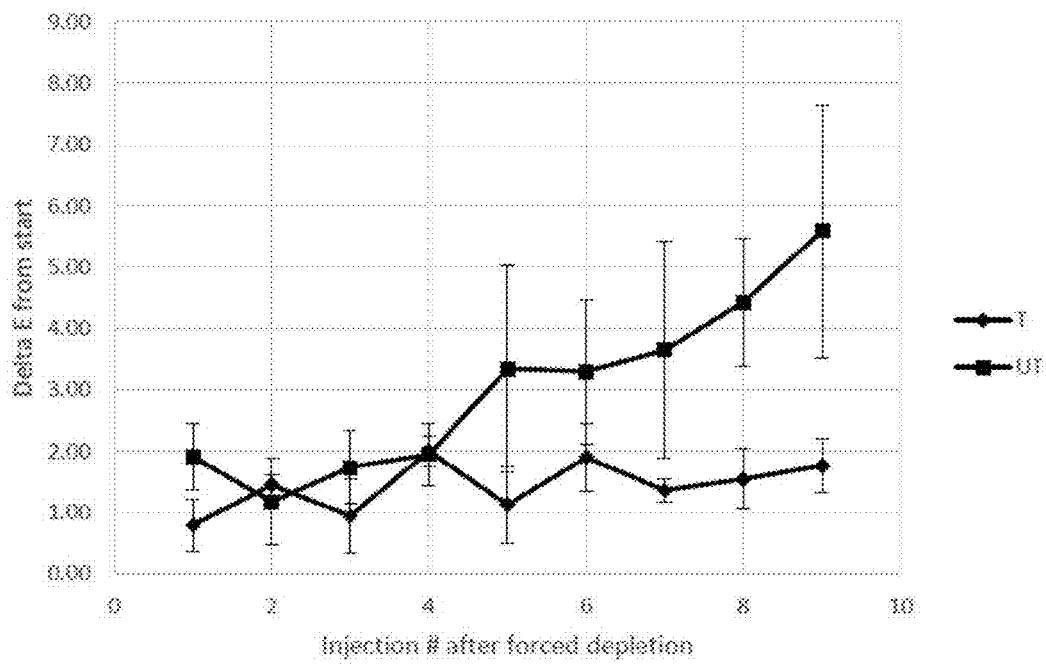
FIG. 8 illustrates deviation in color in a simulated continuous coloring process for three different active agent chemistries using CER treated concentrates (T) relative to batch treated processes (UT).
Figure 8:
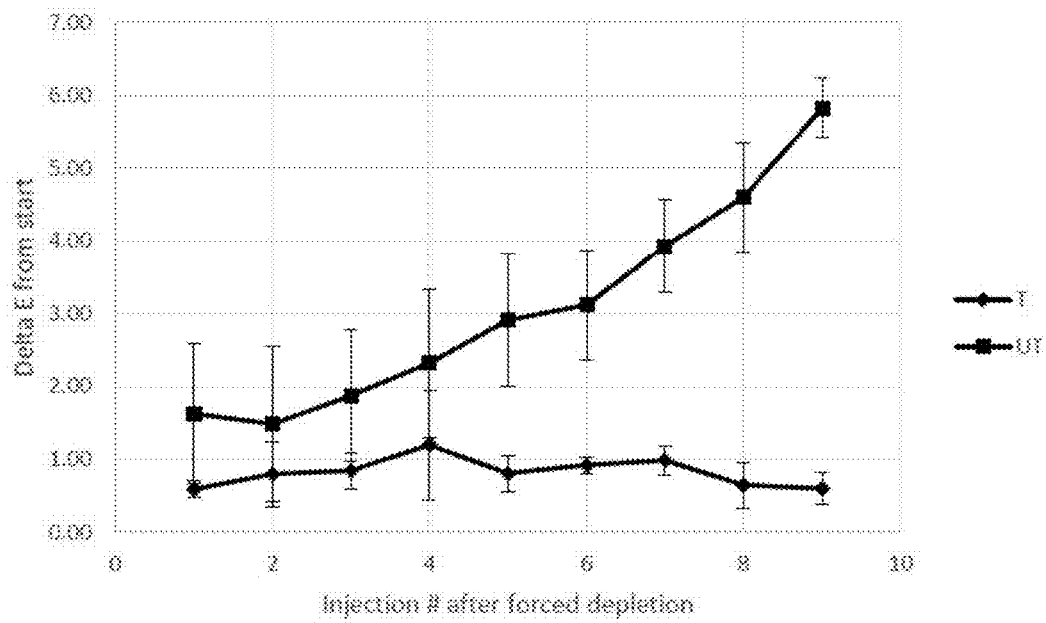

As is illustrated in FIG. 8, the non-CER treated concentrate (UT) led to a significant increase in deviation from the initial color as dilution/repletion was repeated over nine test rounds, whereas when the CER-treated dye concentrate was used the color achieved during the analyses remained substantially constant. This continual increase in deviation from the initial color for the untreated dye concentrate was observed for all dye types tested. The results from all three tests for all three dyes revealed that by round 8 all three dyes produced a statistically significant deviation in color ($p<0.05$, two tailed t-test). The Acid Red 151 dye showed a statistically significant color deviation by round 8 that was more significant at round 9. The Acid Blue 25 showed a statistically significant difference at round 5 that continued through the remainder of the testing protocol. The Acid Blue 9 showed a statistically significant difference at round 3 that continued through the remainder of the testing protocol. With the Acid Blue 9, the reduction at round 5 was also a statistically significant difference with a $p=0.038$. Thus, for all dye types tested, the use of CER-treated dye concentrates allowed for clear maintenance of color over a simulated continual coloring process that was not achieved using a batch treatment continual coloring process.

Various modifications of the provided processes, in addition to those shown and described herein, will be apparent to those skilled in the art of the above description.

It is appreciated that all reagents are obtainable by sources known in the art unless otherwise specified.

Patents, publications, and applications mentioned in the specification are indicative of the levels of those skilled in the art to which the invention pertains. These patents, publications, and applications are incorporated herein by reference to the same extent as if each individual patent, publication, or application was specifically and individually incorporated herein by reference.

The foregoing description is illustrative of particular aspects of the invention, but is not meant to be a limitation upon the practice thereof.

The invention claimed is:

1. A continuous method of contacting an active agent to a linear synthetic polymeric substrate to impart a color to the linear synthetic polymeric substrate, the method comprising:
   contacting an active agent precursor solution with a cation exchange resin (CER), the contacting forming a treated active agent precursor solution;
   diluting a first portion of the treated-active agent precursor solution to form an active agent solution;
   contacting the active agent solution with the polymeric substrate at a treatment temperature and for a treatment time; and
   adding a second portion the treated-active agent precursor solution to the active agent solution to maintain a concentration of the active agent in the active agent solution;
   wherein:
   the polymeric substrate comprises a polyamide polymeric material;
   the active agent precursor solution comprises an active agent comprising an acid dye selected from the group consisting of an anthraquinone acid dye, an azo acid dye, and a triphenylmethane acid dye;
   the CER comprises sulfonic acid functional groups;
   a concentration of the active agent in the active agent precursor solution is in a range from 10 g/L to 50 g/L;
   wherein a mass concentration of the active agent in the active agent precursor solution is in a range from 400% to 1000% relative to a mass concentration of the active agent in the active agent solution; and
   a $\Delta E$ of the polymeric substrate is less than that of an otherwise identical continuous method comprising contacting the active agent solution with the cation exchange resin instead of contacting the active agent precursor solution with the cation exchange resin.

2. The method of claim 1, wherein the treated active agent solution comprises a salt.

3. The method of claim 2, wherein a concentration of the salt in the treated active agent precursor solution is from 0.1 g/L to 0.5 g/L.

4. The method of claim 1, wherein the treatment temperature is from 10° C. to 99° C.

5. The method of claim 1, wherein the treatment time is from 0.001 second to 30 minutes.

6. The method of claim 1, wherein the polymeric material comprises one or more of nylon 6, nylon 66, nylon 6/6-6, nylon 6/9, nylon 6/10, nylon 11, nylon 12, or any combination thereof.

7. The method of claim 6, wherein the acid dye comprises one or more of Acid Blue #60, Acid Blue #260, Acid Red #151, Acid Red #407, Acid Red #151, Mordant Red 7, Acid Red #1, Acid Black #2, Acid Yellow #23, Acid Yellow #43, Acid Yellow #36, Acid Yellow #232, Acid Orange #144, Acid Black #107, Acid Violet #90, and Acid Violet #17.

8. The method of claim 1, wherein the active agent precursor solution is an aqueous solution of an acid dye.

9. The method of claim 1, wherein the active agent precursor solution is contacted with the CER 2 or more times.

10. The method of claim 1, wherein the amount of CER, in equivalents is 0.1 to 10 times the moles of active agent exposed to the resin in the active agent precursor solution.

11. The method of claim 1 wherein the treated active agent precursor solution is continuously or discontinuously supplied to the active agent solution during the treatment time.

12. The method of claim 1, wherein the mass concentration of the active agent in the active agent precursor solution is in a range from 600% to 1000% relative to a mass concentration of the active agent in the active agent solution.

13. The method of claim 1, wherein adding the second portion of the treated active agent precursor solution to the active agent solution to maintain a concentration of the active agent in the active agent solution comprises a plurality of additions of the second portion of the treated-active agent precursor solution to the active agent solution.

14. The method of claim 1, wherein the continuous process comprises at least 3 additions of the second portion of the treated active agent precursor solution to the active agent solution to maintain the concentration of the active agent in the active agent solution.

15. The method of claim 1, wherein the continuous process comprises at least 5 additions of the second portion of the treated active agent precursor solution to the active agent solution to maintain the concentration of the active agent in the active agent solution.

16. The method of claim 1, wherein a $\Delta E$ of 3 or less is maintained throughout the continuous method.

17. The method of claim 1, wherein the treatment temperature is in a range from 80° C. to 100° C.

18. The method of claim 1, wherein the cation exchange resin is a macroporous polystyrenic strong acid cation resin in hydrogen form with sulfonic acid functional groups.

* * * * *